Oct. 7, 1930.  J. HOJNOWSKI  1,777,492
HELICOPTER AEROPLANE
Filed Jan. 25, 1929   2 Sheets-Sheet 1
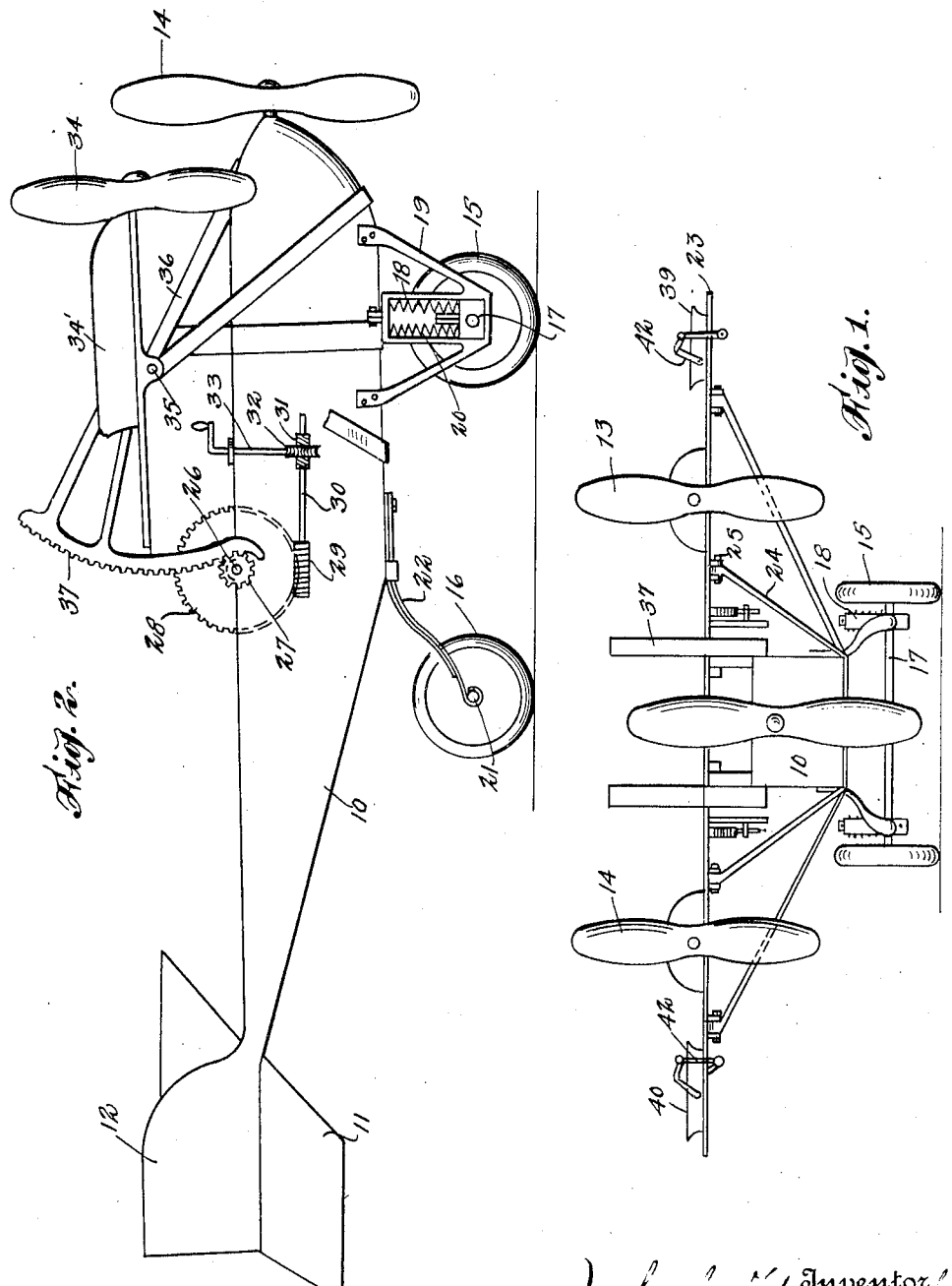
Inventor
Jakob Hojnowski Oct. 7, 1930.                    J. HOJNOWSKI                    1,777,492
                              HELICOPTER AEROPLANE
                       Filed Jan. 25, 1929          2 Sheets-Sheet 2
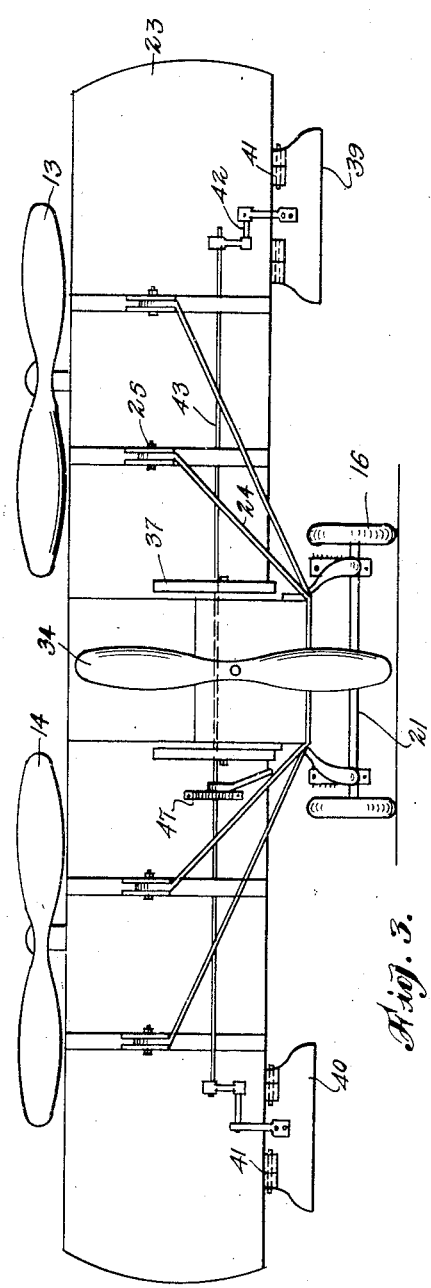
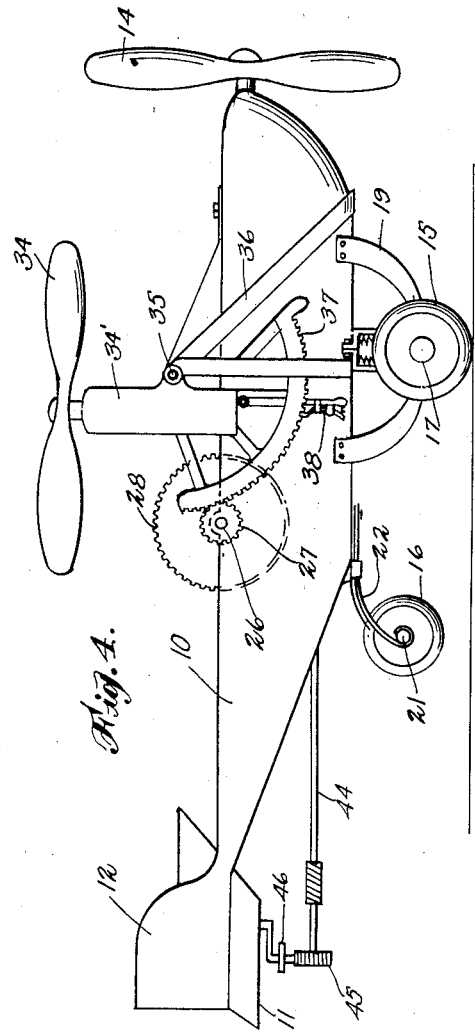
Inventor
Jakob Hojnowski Patented Oct. 7, 1930

1,777,492

UNITED STATES PATENT OFFICE

JAKOB HOJNOWSKI, OF NEKOOSA, WISCONSIN

HELICOPTER AEROPLANE

Application filed January 25, 1929. Serial No. 334,974.

This invention relates to improvements in aeroplanes and more particularly to a helicopter machine, and it is the principal object of my invention to provide an aeroplane in which the helicopter propeller can be raised and lowered.

Another object of my invention is the provision of an aeroplane equipped with helicopter propulsion having its tiltable wing or plane equipped with tiltable vanes for assisting in the elevation and descension of the plane.

A further object of my invention is the provision of a helicopter aeroplane equipped with simple yet efficiently operating means to elevate and lower the helicopter propeller and with means for locking the helicopter propeller in its elevated or operating position.

A still further object of my invention is the provision of an aeroplane equipped with a helicopter propeller which in its lowered position may also be used as driving propeller.

These and other objects and advantages of my invention will become more fully apparent as the description thereof proceeds and will then be specifically defined in the appended claim.

In the accompanying drawings forming a material part of this disclosure:

Fig. 1 is a front view of an aeroplane constructed according to my invention with the helicopter propeller in its horizontal position.

Fig. 2 is a side elevation thereof.

Fig. 3 is a top plan view of the aeroplane.

Fig. 4 is a side elevation of the machine with the helicopter propeller in vertical or operating position.

As illustrated, my aeroplane comprises the customary body 10 of any desired shape or material, equipped with the usual steering planes 11 and 12, motor operated driving propellers 13, 14, front landing and starting wheels 15 and rear landing wheels 16.

The front landing gear and wheels 15 are supported by an axle 17 journaled in hangers 18 suspended by brackets 19 from the body of the aeroplane and suitably cushioned by means of helical springs 20 arranged within hangers 18 as illustrated.

The rear landing gear and wheels 16 are supported by an axle 21 supported by laminated springs 22 suitably fastened to the axle 21 and the body of the aeroplane.

The aeroplane body carries the usual wing or plane 23 tiltably arranged by means of the struts 24 or the like having their ends secured to the underside of the wing by swivel arrangements 25. Within the body, a transverse axle 26 is journaled, carrying small gears 27 and in juxtaposition thereto larger worm gears 28.

The worm gears 28 are in mesh with worms 29 at the ends of shafts 30 parallel to the sides of the body and carrying near their opposite ends worms 31 in mesh with worm gears 32 adapted to be operated by means of cranks 33, suitably arranged in the body of the aeroplane.

A helicopter propeller 34 adapted to be operated by the intermediary of suitable mechanism from the motor, has its shaft arranged in a socket 34', pivotally attached, at 35, to a frame work 36 secured to the body 10 so that it can be elevated or lowered by means of toothed segments 37 in engagement with the small gears 27, or brought from its horizontal position shown in Figure 2 into its elevated or operating position illustrated in Figure 4 in which position it can be locked by means of the locking devices 38 of any well known construction. It will be clear that in its lowered position the propeller 34 may also be used as driving propeller.

Supplemental vanes 39, 40 are hingedly connected to the wing or plane for facilitating the raising and lowering. These vanes are hingedly secured, as at 41, to the wing and can be operated to assume different positions to the main wing 23 by means of lever systems 42 or the like operated from a common shaft 43.

The operation of the steering vanes 11 and 12 is effected by means of a shaft 44 operated from any suitable mechanism within the body of the aeroplane, by the intermediary of a gear 45 and lever or crank mechanism generally designated 46.

The operation of my device will be entirely clear from the above description by the simultaneous inspection of the drawing, and it will be clear that at the start the helicopter propeller 34 is brought by the suitable operation of segments 37 into its elevated or operating position and locked therein by means of the locking devices 38. After the plane has ascended to a desired height, the helicopter propeller is lowered again into the position illustrated in Figure 2 and can then be used as driving propeller also.

It will be understood that any desired well known mechanisms may be employed for operating the propellers from any type of motor arranged within the plane in the usual customary manner.

The operation of the supplementary vanes 39, 40, may also be effected by any well known means from a gear 47 on shaft 43.

While I have shown and described the preferred form of my aeroplane and driving means I desire to reserve my right to make such changes therein and in the construction of the minor details thereof as come within the scope of the appended claim without departure from the spirit of my invention.

Having thus described my invention, what I claim as new and desire to secure by Letters Patent is:

In an aeroplane including its plane or wing, a helicopter propeller, means for elevating and lowering said propeller, means for locking the same in its raised position, supplementary vanes hingedly attached to said wing near its outer ends, a system of levers adapted to turn said vanes about their hinges, a common shaft for operating said system of levers, and means for rotating said shaft.

Signed at Nekoosa, in the county of Wood and State of Wisconsin, this 2nd day of October A. D. 1928.

JAKOB HOJNOWSKI.